US010528645B2

(12) United States Patent
Kumar

(10) Patent No.: US 10,528,645 B2
(45) Date of Patent: Jan. 7, 2020

(54) CONTENT SEARCH USING VISUAL STYLES

(71) Applicant: Amazon Technologies, Inc., Seattle, WA (US)

(72) Inventor: Sudhir Kumar, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 381 days.

(21) Appl. No.: 14/856,383

(22) Filed: Sep. 16, 2015

(65) Prior Publication Data
US 2017/0075862 A1 Mar. 16, 2017

(51) Int. Cl.
G06F 17/00 (2019.01)
G06F 17/21 (2006.01)

(52) U.S. Cl.
CPC .................. G06F 17/211 (2013.01)

(58) Field of Classification Search
CPC ............ G06F 17/30864; G06F 17/24
USPC .......... 715/243, 255, 200, 204, 247
See application file for complete search history.

(56) References Cited

U.S. PATENT DOCUMENTS

| | | | | |
|---|---|---|---|---|
| 5,873,660 A * | 2/1999 | Walsh | ..................... | G06F 17/24 400/63 |
| 5,999,896 A * | 12/1999 | Richardson | ........... | G06F 17/274 704/9 |
| 6,044,387 A * | 3/2000 | Angiulo | .................. | G06F 17/24 707/999.003 |
| 7,526,425 B2 * | 4/2009 | Marchisio | ......... | G06F 17/30672 704/9 |
| 7,890,516 B2 * | 2/2011 | Zarzar Charur | .... | G06F 17/3064 707/706 |
| 8,181,104 B1 * | 5/2012 | Helfand | .............. | G06F 17/2247 715/234 |
| 2002/0129053 A1 * | 9/2002 | Chan | ..................... | G06F 17/246 715/213 |
| 2006/0015804 A1 * | 1/2006 | Barton | .................. | G06F 17/246 715/213 |
| 2007/0156669 A1 * | 7/2007 | Marchisio | ......... | G06F 17/30731 |
| 2008/0263443 A1 * | 10/2008 | Maxime | .............. | G06F 17/2755 715/271 |
| 2009/0305682 A1 * | 12/2009 | Spalink | ............. | G06F 17/30905 455/414.3 |
| 2014/0040730 A1 * | 2/2014 | Prasad | .................. | G06F 17/218 715/249 |

OTHER PUBLICATIONS

Le Hoang, Word: Find All Occurrences of a Specific Font in a Document, Published Mar. 31, 2014, tech-recipes.com, pp. 1-3 (pdf).*

* cited by examiner

Primary Examiner — Manglesh M Patel
(74) Attorney, Agent, or Firm — Lowenstein Sandler LLP

(57) ABSTRACT

A processing device in an electronic device receives a search query for a reflowable electronic content item, the search query indicating at least one of a first formatting style or a first formatting construct. The processing device determines a first page of the electronic content item for which style data indicates that at least a portion of content data associated with the first page was previously presented using the at least one of the first formatting style or the first formatting construct, wherein the content data associated with the first page is defined according to previous display configuration settings used to previously present the first page. The processing device causes presentation of an indication of the first page as a search result.

20 Claims, 7 Drawing Sheets

CONTENT SEARCH USING VISUAL STYLES

BACKGROUND

A large and growing population of users enjoys entertainment through the consumption of media items, including electronic media, such as electronic books (also referred to herein as ebooks), electronic newspapers, electronic magazines, other electronic publications, audio books, and digital video. Users employ various electronic devices to consume such media items. Among these electronic devices are electronic book readers, cellular telephones, personal digital assistants (PDAs), portable media players, tablet computers, electronic pads, netbooks, desktop computers, notebook computers, and the like.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
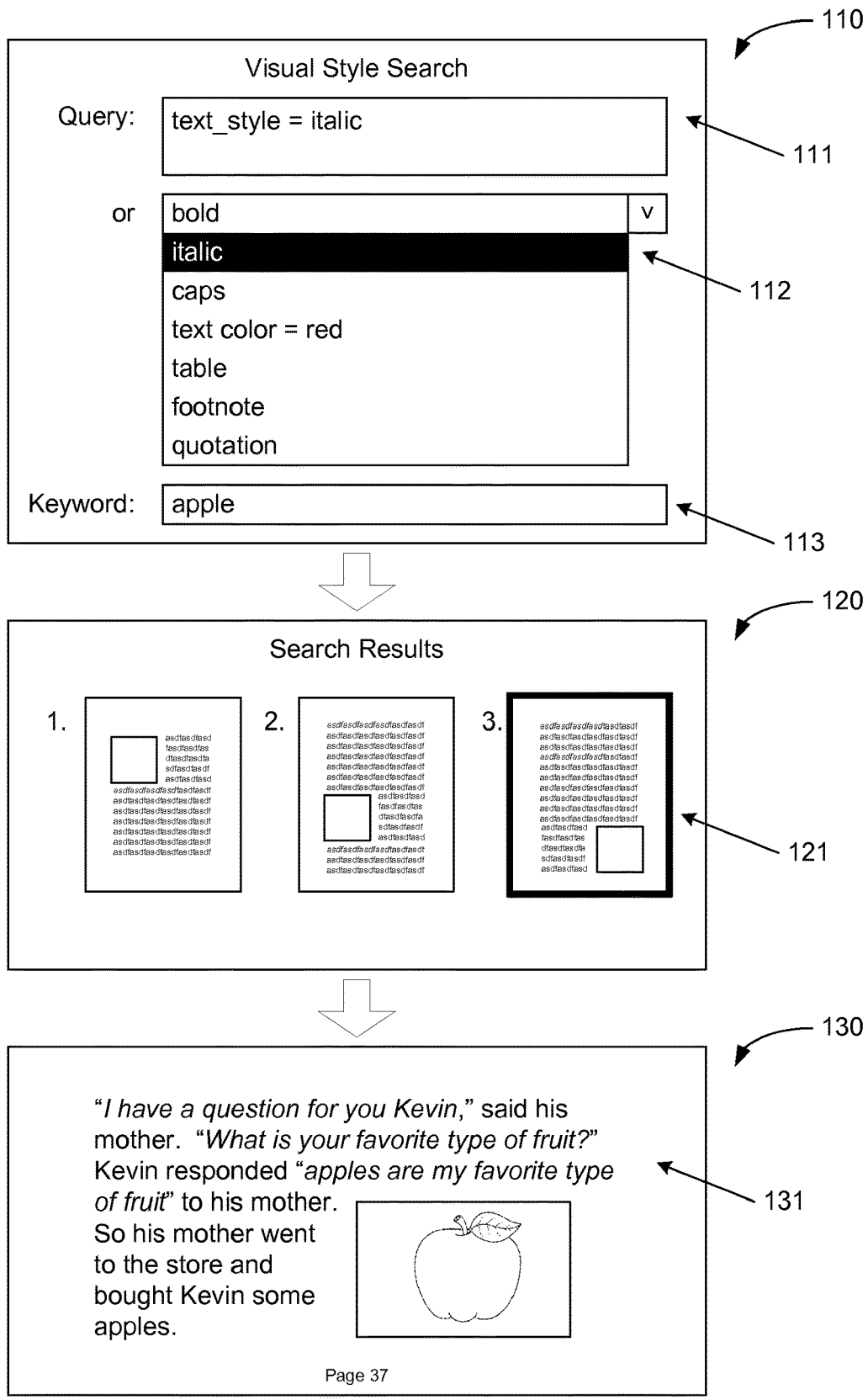
FIG. 1 is a diagram illustrating content search using visual styles.

The primary search experience for textual content in electronic publications utilizes a textual keyword search. In this type of search, a user provides an input such as a search term, phrase, string or query, and an application locates occurrences of the search term in the text and identifies the locations where that term has been referenced. The user can then choose the appropriate location from the set of results. In general, this search locates exact matches of the provided search term, so the user must remember the term for which he is searching. If, however, the user does not remember the exact phrasing, spelling, etc. of the search term and just has a visual picture of the location of the search term in mind, the search experience provides no easy way to reach that location.

In addition, the way pages of an electronic content item are rendered can change over time or across devices, especially in a reflowable content item. The presentation of a reflowable content item can be adapted according to the output device. The reflowable content item may include content data with continuous text without any formatting or page breaks. The current display configuration settings for an electronic device can control how much and what content appears on each page. The display configuration settings can include, for example, display size, display orientation, font size, font type, margin size, character spacing, etc.; each of which can potentially impact the pagination of a reflowable content item. These settings can also change over time such as if the user manually adjusts one or more settings or if the user switches the device on which they are consuming the content item. As a result, the content for which the user is searching may have appeared on a given page when it was previously viewed by the user (e.g., at the top of page 37) but given the change in display configuration settings, would appear on a different page (e.g., at the bottom of page 36) if it were rendered again using the current display configuration settings. Consequently, if the user has a picture in their mind of the desired content (e.g., a quotation presented in italic font) occurring at the top of a page, but they don't recall the exact phrasing of the quotation, the user may have difficulty identifying the content in the search results.

Embodiments are described for content search using visual styles. A visual search can be performed that is based on the visuals that the user might remember from his previous reading of the content. For example, if the user previously read a quotation in the book somewhere, and the user remembers that the quotation was styled in bold and italic font, but does not remember the actual phrasing of the quotation, the user can search the electronic content for occurrences of that style of text instead of the actual words or phrases used in the quotation. Continuing with the above example, the user can perform a search for the occurrences of text styled in bold and italic fonts in the electronic publication and can choose a particular occurrence from returned search results.

In one embodiment, the search results include images of pages of the content having the requested visual formatting style or formatting construct as they appeared when they were previously presented to the user (i.e., rendered according to previous display configuration settings in effect when the page was previously presented). Thus, even if the display configuration settings used to present the reflowable content item have changed since the content was previously presented, the user can still identify the desired portion of the content based on a visual picture of the presentation of the content in their mind.

In one embodiment, a visual style search engine scans the complete content to identify all the different formatting styles used in the book for different types of constructs and related context and builds a visual style index that can be searched by formatting styles and constructs/context. The visual style index may include an indication of a location in the reflowable content where the formatting styles or constructs are used, as well as an indication of the display configuration settings in effect when the corresponding portion of the content was previously presented, so that the pagination at that time can be recreated in order to present the user with meaningful search results. Formatting styles included in the visual style index may include, for example, bold text, italic text, capitalized text, colored text, etc. Formatting constructs included in the visual style index may include, for example, text presented in a table, text presented in a footnote, text presented as a quotation, etc. In the construct based search example, if the user remembers reading something interesting in a table and he wants to search for that item, he can perform a search which will identify all tables in the content or limit the search to content occurring within tables. In this manner, the user can translate his visual memory of previously read content into meaningful search results.

A visual search utilizing formatting styles and constructs presents a visual model to readers and provides a novel way for them to use that model to navigate through and search within electronic content. In one embodiment, the visual style search engine can present a search interface, varying from a simple implementation based on raw search command input to a more advanced version where the user may select from a list of formatting styles to use as options for the search terms. As long as the user has some memory of the visual presentation, he can easily find the desired content using the visual search techniques described herein.

In one embodiment, the search input from the user may include audio data representing user speech captured by a microphone. For example, the user may speak a query indicating the portion of the content they remember (e.g., "in Book ABC, that I was reading yesterday, there was a quote that was by Einstein towards the top of a page—what was that quote?"). In one embodiment, the visual style search engine may uses the portions of speech indicated above in bold to create a search query that can identify portions of the content that may match the user's description. For example, "Book ABC" can be used to identify content source (other content source examples include website, newspaper, email/text/other message, magazine, or any other electronic publication/interaction with electronic device). "Yesterday" could help narrow the range of options within the content source (e.g., what pages/words did the user read yesterday). "Quote" could be used to identify the formatting style (e.g., presented in italics or between a set of quotation marks). And "top of page" could be used to identify the position of the content on a page as previously presented. Additional details of the visual style content search are provided below.

FIG. 1 is a diagram illustrating content search using visual styles, according to an embodiment. Display 110 of an electronic device presents a visual style search interface, through which a user may provide a visual search query to be executed against electronic content on the electronic device. In one embodiment, the search query indicates at least one of a first formatting style or a first formatting construct. In one embodiment, a visual style search engine on the electronic device causes presentation of the visual search interface in display 110. The visual search interface may include a visual style search input field 111, a selectable menu 112 with a plurality of formatting style and formatting construct options, and a keyword search input field 113. In one embodiment, visual style search input field 111 may receive a user input search query indicating the at least one of the first formatting style or the first formatting construct. The search query may have a specific search syntax (e.g., "text_style=italic") or may be provide in a generic form (e.g., "italics"). Selectable menu 112 may be, for example, a drop down menu including a list of all available formatting style and construct options. The user may select one or more of the presented options for inclusion in the visual search. Keyword search input field 113 can optionally receive a user input keyword or phrase. If a keyword is provided, the search of the electronic content may be limited to occurrences of the keyword presented according to the visual style or styles indicating using visual style search input field 111, a selectable menu 112, or both. In the illustrated embodiment, the formatting style "italic" has been selected from selectable menu 112 and the keyword "apple" has been entered in keyword search input field 113. If no keyword is provided in field 113, the visual style search engine may locate the occurrences of text in the electronic content presented according to the visual style or styles indicating using visual style search input field 111 or a selectable menu 112, without regard to the words presented in those styles. In one embodiment, the visual style search engine may return all occurrences of text presented in those styles.

Display 120 presents a visual style search results interface including the result of the visual style search executed against the electronic publication. In one embodiment, the search results include images of pages from the electronic content having occurrences that correspond to the parameters input to the visual style search interface in display 110. If the display configuration settings on the electronic device have changed, the images in the search results may represent the rendering of the pages according to the display configuration settings in effect when that page was previously presented, rather than how the page would be rendered according to the current display configuration settings. In the illustrated example, display 120 includes selectable indications of three pages from the reflowable content item where the keyword "apple" was presented in italics in the electronic content. In one embodiment, the third result 121 may be selected by the user (e.g., using a mouse, trackpad, keyboard, or other user input device), as shown. In another embodiment, the search results may also include portions of the electronic content at the locations where the selected formatting style is used to present the content (e.g., "snippets" of the content). In some embodiments, a location in an e-book may correspond to one or more underlying byte ranges of the reflowable content item. Thus, a given location will refer to a consistent portion of the content item regardless of changes in pagination attributable to current display configuration settings. It will be appreciated, however, that any other types of metrics for measuring the text may also be used, such as an amount of words, paragraphs, pages, and/or the like.

In response to the selection of one of the search results from display 120, display 130 presents a page 131 of the electronic content corresponding to the selected search result. For example, if the electronic content is a digital publication, the visual style search engine may navigate to the page of the digital publication where the selected search result is presented and display all or a portion of that page. In one embodiment, the page 131 is rendered according to the previous display configuration settings in effect when that page was previously presented so that the page looks as the user remembers it from earlier consumption. In another embodiment, the page 131 (or a portion of the page) of the electronic content may be presented in a separate window (e.g., a pop-up or modal window). The portion of the electronic content may include the selected keyword and may be presented using the selected visual style, as indicated in the performed visual search.

Figure 2:
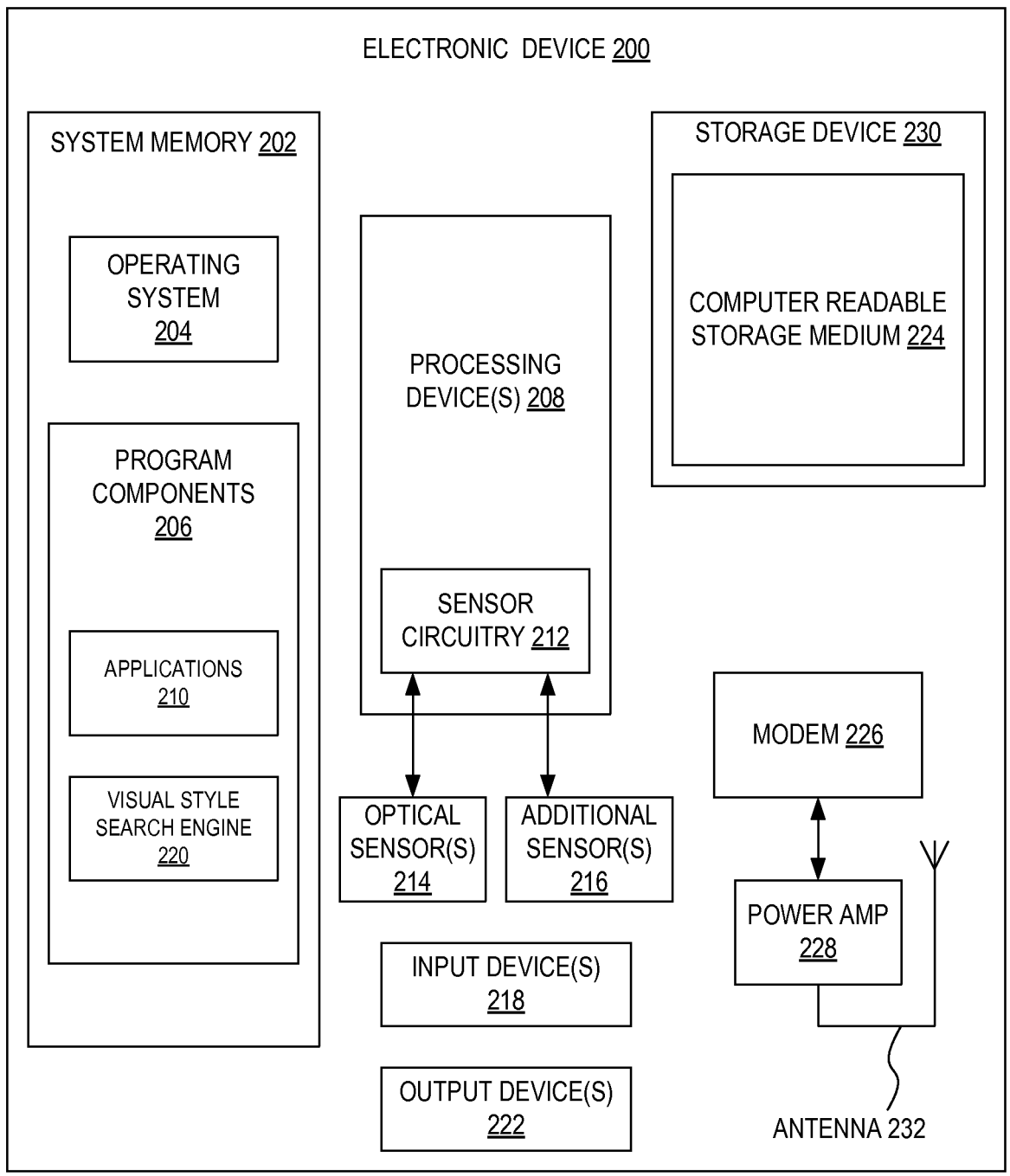
FIG. 2 is a block diagram illustrating a user device configured for content search using visual styles, according to an embodiment.

FIG. 2 is a block diagram illustrating an electronic device 200 configured for content search using visual styles, according to an embodiment. Electronic device 200 may include for example, an electronic book reader (eReader), cellular telephone, smartphone, personal digital assistant (PDA), portable media player, tablet computer, electronic pad, netbook, desktop computer, notebook computer, or the like.

The electronic device 200 includes one or more processing devices 208, such as one or more CPUs, microcontrollers, field programmable gate arrays, or other types of processing devices. The electronic device 200 also includes system memory 202, which may correspond to any combination of volatile and/or non-volatile storage mechanisms. The system memory 202 stores information which provides an operating system component 204, various program components 206 including applications 210 and visual style search engine 220, and/or other components. The electronic device 200 performs functions by using the processing device(s) 208 to execute instructions provided by the system memory 202.

Applications 210 may be computer application programs that offer varying functionality. For example, one of applications 210 may be an electronic reader application that enables consumption of one or more types of digital content and electronic media items. The digital content and electronic media items may include electronic books (ebooks) such as electronic textbooks and/or other electronic publications (electronic versions of publications) such as electronic magazines, digital newspapers, digital audio books, electronic journals, real simple syndication (RSS) feeds, etc. One of applications 210 may be a web browser that enables loading and viewing of web pages from the Internet or other network. One of applications 210 may be an email or messaging program than enables the sending and receiving of electronic mail messages, short message service (SMS) messages, multimedia messaging service (MMS) messages, or other types of messages. In one embodiment, applications 210 may include any other types of entertainment, productivity, communication, social networking, or other types of applications.

In one embodiment, visual style search engine 220 performs a visual search of an electronic publication or other information in one of applications 210 and locates a portion of the content from the electronic publication based on the formatting style or formatting construct in which the portion of the content is presented. For example, visual style search engine 220 can identify portions of the content presented using bold text, italic text, capitalized text, colored text, text presented in a table, text presented in a footnote, or text presented as a quotation. Visual style search engine 220 need not receive a keyword, search term or other indication of the actual content in order to perform the visual search. In certain embodiment, however, the search can be further refined by including a keyword or other search term in addition to an indication of a formatting style or formatting construct of the textual content. In one embodiment, visual style search engine 220 may be a standalone component, as shown in FIG. 2. In other embodiments, visual style search engine 220 may be an integrated part of an operating system running on electronic device 200, or of one of applications 210, such as an electronic reader application. Additional details of visual style search engine 220 are provided below with respect to FIGS. 3-6.

The electronic device 200 also includes a data storage device 230 that may be composed of one or more types of removable storage and/or one or more types of non-removable storage. Storage device 230 may include a main memory, such as read-only memory (ROM), flash memory, dynamic random access memory (DRAM) (such as synchronous DRAM (SDRAM), etc.), or a static memory, such as flash memory, static random access memory (SRAM), etc. In other embodiments, storage device 230 may include some other type of storage device for storing information in a form (e.g., software, processing application) readable by a machine (e.g., a computer). The storage device 230 may include a machine-readable medium including, but not limited to, magnetic storage medium (e.g., floppy diskette), optical storage medium (e.g., CD-ROM), magneto-optical storage medium, erasable programmable memory (e.g., EPROM and EEPROM), flash memory; or another type of medium suitable for storing electronic instructions. In one embodiment, the data storage device 230 includes a computer-readable storage medium 224 on which is stored one or more sets of instructions embodying any one or more of the methodologies or functions described herein. As shown, the instructions may reside, completely or at least partially, within the computer readable storage medium 224, system memory 202 and/or within the processing device(s) 208 during execution thereof by the electronic device 200, the system memory 202 and the processing device(s) 208 also constituting computer-readable media. The electronic device 200 may also include one or more input devices 218 (keyboard, mouse device, specialized selection keys, etc.) and one or more output devices 222 (displays, printers, audio output mechanisms, etc.).

The electronic device 200 further includes a wireless modem 226 to allow the electronic device 200 to communicate via a wireless network (e.g., such as provided by the wireless communication system) and/or with other computing devices, such as remote computers, the item providing system, online book stores, electronic catalogs for libraries, and so forth. The wireless modem 226 may allow the electronic device 200 to handle both voice and non-voice communications (such as communications for text messages, multimedia messages, media downloads, web browsing, etc.) with the wireless communication system 710. The wireless modem 226 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi, etc. The wireless modem 226 may generate signals and send these signals to power amplifier (amp) 228 for amplification, after which they are wirelessly transmitted via antenna 232. In addition to sending data, antenna 232 also receives data, which is sent to wireless modem 226 and transferred to processing device(s) 208.

In one embodiment, electronic device 200 includes an optical sensor 214. The optical sensor 214 may be a low resolution camera (e.g., having 0.2 or 0.3 Megapixels) that takes images (e.g., of a user's eyes) on a periodic basis. Alternatively, the optical sensor 214 may have a higher resolution, such as 1 Megapixel up to 10 or more Megapixels. The optical sensor 214 may be positioned such that images are taken of a user's face while the user holds the electronic device 200 in front of his face in a standard reading position. Therefore, the optical sensor 214 may be used to track user eye movement during reading.

In one embodiment, electronic device 200 includes one or more additional sensors 216 such as a physical contact sensor, close proximity sensors, or motion sensors. The sensors 216 can detect the presence of human body parts, and convey information regarding the detected presence to processing device(s) 208. In one embodiment, the sensors 216 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 216 may also be optical (e.g., infrared) sensors that use an emitter and receiver pair to detect the presence of opaque objects. Alternatively, the sensors 216 may be inductive sensors, which include an inductive loop. When the presence of a human body part (or metal object) is brought close to the inductive sensor, an induction of the inductive loop changes, causing the human body part to be detected. Alternatively, the sensors 216 may be ultrasonic sensors that emit an ultrasonic signal and measure a time duration between when a signal is transmitted and the reflection of that signal received (a.k.a., flight response). The sensors 216 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part, other types of objects may also be detected depending on the sensing technologies used.

In one embodiment, the additional sensors 216 include a motion sensor, such as an accelerometer or one or more gyroscopes. The electronic device 200 may use motion data from motion sensors to determine whether a user is holding the electronic device 200. For example, if the electronic device 200 experiences constant minor accelerations, it may be determined that the electronic device 200 is being held in a user's hand. Additionally, if the electronic device 200 is at a particular angle (detectable based on acceleration readings from an accelerometer), it may be determined that the electronic device 200 is being rested on a user's leg during reading.

The processing device(s) 208 may include sensor circuitry 212 (e.g., sensor device drivers) that enables the processing device(s) 208 to interpret signals received from the optical sensor(s) 214 and/or additional sensors 216. In one embodiment, the optical sensors 214 and/or additional sensors 216 output raw sensor data. In another embodiment, the optical sensors 214 and/or additional sensors 216 output fully processed signals to the processing device(s) 208. For example, the additional sensors 216 may output a user contact/no user contact signal using a single line interface or a multi-line interface. In another embodiment, the additional sensors 216 output, for example, positional data and/or object presence data (e.g., of a human body part) to the processing devices 208 without first processing the data. In either instance, the processing devices 208 may use the sensor circuitry 212 to process and/or interpret the received data. If data is received from multiple sensors, processing the data may include averaging the data, identifying a maximum from the data, or otherwise combining the data from the multiple sensors.

Figure 3:
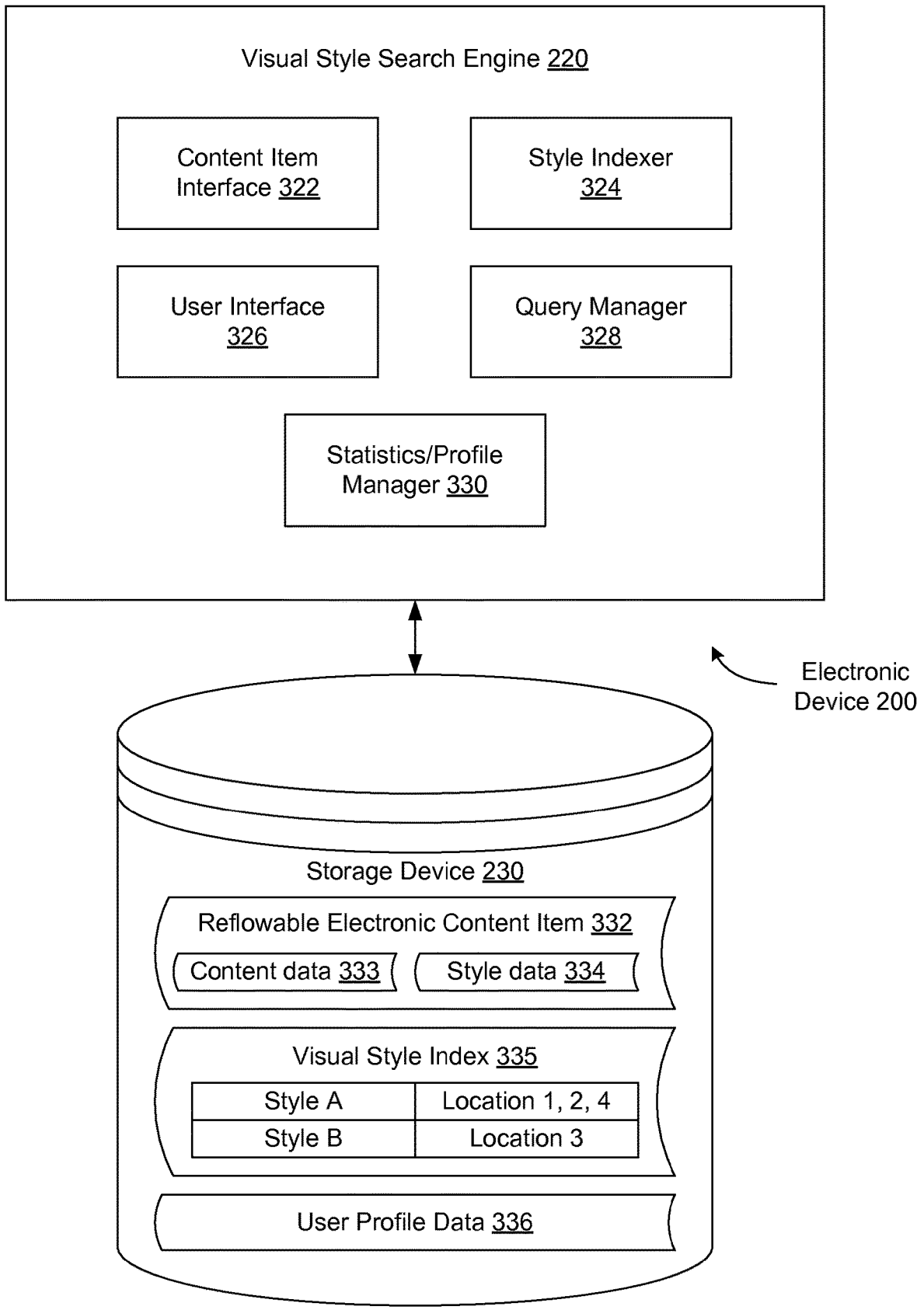
FIG. 3 is a block diagram illustrating a visual style search engine, according to an embodiment.

FIG. 3 is a block diagram illustrating a visual style search engine 220 that is included in electronic device 200, according to an embodiment. In one embodiment, visual style search engine 220 may include content item interface 322, style indexer 324, user interface 326, query manager 328 and statistics/profile manager 330. This arrangement of components may be a logical separation, and in other embodiments, these components can be combined together or separated in further components, according to a particular embodiment. In one embodiment, visual style search engine 220 is connected to storage device 230 having a data store, which may be, for example, a file system, database or other data management layer resident on a data storage device such as a disk drive, RAM, ROM, flash memory, etc. The data store may include reflowable electronic content item 332, visual style index 335 and user profile data 336. In one embodiment, electronic device 200 may include both visual style search engine 220 and storage device 230. In another embodiment, storage device 230 may be external to electronic device 200 and may be connected to electronic device 200 over a network or other connection. In other embodiments, electronic device 200 may include different and/or additional components which are not shown in order to simplify the description.

In one embodiment, content item interface 322 controls interaction with content items, such as reflowable electronic content item 332. Reflowable electronic content item 332 may be for example, an electronic book (ebook), electronic magazine, digital newspaper, electronic journal, electronic mail (email) message, website, etc. In one embodiment, content item interface 322 may access reflowable electronic content item 332, including content data 333 and style data 334 from storage device 230. Content data 333 may include the actual text of the reflowable electronic content item 332 without any formatting, styling, etc. Style data 334 may include an indication of any specific formatting styles or constructs associated with presentation of the content data 333 on electronic device 200. For example, style data 334 may include formatting information for individual portions of the content (e.g., by character, word, line, sentence, paragraph, page, chapter, section). In one embodiment, content item interface 322 may receive reflowable electronic content item 332, including content data 333 and style data 334 from a digital content providing system and store the reflowable electronic content item 332 on storage device 230. In another embodiment, reflowable electronic content item 332 may already be present on storage device 230 and content item interface 322 can access reflowable electronic content item 332 from there.

In one embodiment, style indexer 324 generates a visual style index 335 corresponding to reflowable electronic content item 332. Style indexer 324 may parse style data 334 of the reflowable electronic content item 332 to identify the formatting styles and constructs used to present the content. The generated visual style index 335 may include an entry associated with each of the formatting styles and constructs. Each entry may further include an indication of the portions of the content data 333 for the electronic publication that are to be presented in the corresponding formatting style or construct, as indicated in the style data 334. For example, a first entry in visual style index 335 may correspond to the formatting style of italicized text. The entry for italicized text may include an indication of the location in the reflowable electronic content item 332 of each occurrence of the use of italicized text (e.g., page 3, lines 2-7 or page 27, line 12 words 3-5). In another embodiment, each occurrence may be included in a separate entry in visual style index 335. In one embodiment, style indexer 324 generates visual style index 335 upon receipt of reflowable electronic content item 332. In another embodiment, style indexer 324 generates visual style index 335 in response to the first visual search query requested by a user of electronic device 200. Visual style index 335 may be stored on storage device 230 along with reflowable electronic content item 332 for future use by visual style search engine in executing visual search queries against reflowable electronic content item 332.

Formatting styles included in visual style index 335 may include, for example, bold text, italic text, capitalized text, colored text, etc. In one embodiment, there may be any number of formatting styles used and indexed. For example, the formatting styles may include any styles identified by the Cascading Style Sheets (CSS) language that describes the look and formatting of the content. Formatting constructs included in the visual style index may include, for example, text presented in a table, text presented in a footnote, text presented as a quotation, etc. In general formatting constructs may be identifiable structure used to present content of the electronic publication. In one embodiment, the formatting constructs are identified in style data 334.

In one embodiment, a user may be able to edit or add to visual style index 335 over time. For example, a user may define a new style that was not originally defined in style data 334 and thus was not present in visual style index 335. If the user is able to define the characteristics of the style and identify corresponding locations in reflowable electronic content item 332 where that style is used, a new entry can be added to visual style index 335. The newly defined style can be used for future visual search queries on reflowable electronic content item 332.

In one embodiment, user interface 326 generates and presents a user interface, such as those shown in FIG. 1, to enable interaction between visual style search engine 220 and a user of electronic device 200. In one embodiment, user interface 326 receives user input entered through the graphical user interfaces of displays 110 and 120. User interface 326 may provide that information to the other components of visual style search engine 220, such as query manager 328. In one embodiment, user interface 326 may present output information in the graphical user interfaces of displays 120 and 130 indicating the results of the visual search query performed by visual style search engine 220.

In one embodiment, query manager 328 executes visual search queries against reflowable electronic content item 332. In one embodiment, query manager 328 identifies an entry or entries in visual style index 335 corresponding to a selected formatting style or construct received by user interface 326. From the identified entry or entries, query manager 328 identifies locations in reflowable electronic content item 332 where the selected formatting style or construct is used to present content 333 of the reflowable electronic content item 332. Query manager 328 may provide these locations to user interface 326, which can cause presentation of the locations as search results.

In one embodiment, statistics/profile manager 330 maintains statistics related to visual search queries and updates user profile data 336 in storage device 230. For example, statistics/profile manager 330 may record an indication of the formatting styles and constructs used in visual style search queries and associate the indication with a user profile corresponding to the search queries. In another embodiment, statistics/profile manager 330 may associate the visual style index 335 with a user profile data 336 corresponding to reflowable electronic content item 332. In this manner, if reflowable electronic content item 332 is accessed by the user on a different device when logged in under the same user profile, the visual style index 335 may be available to the user on that different device for use in executing visual search queries.

Figure 4:
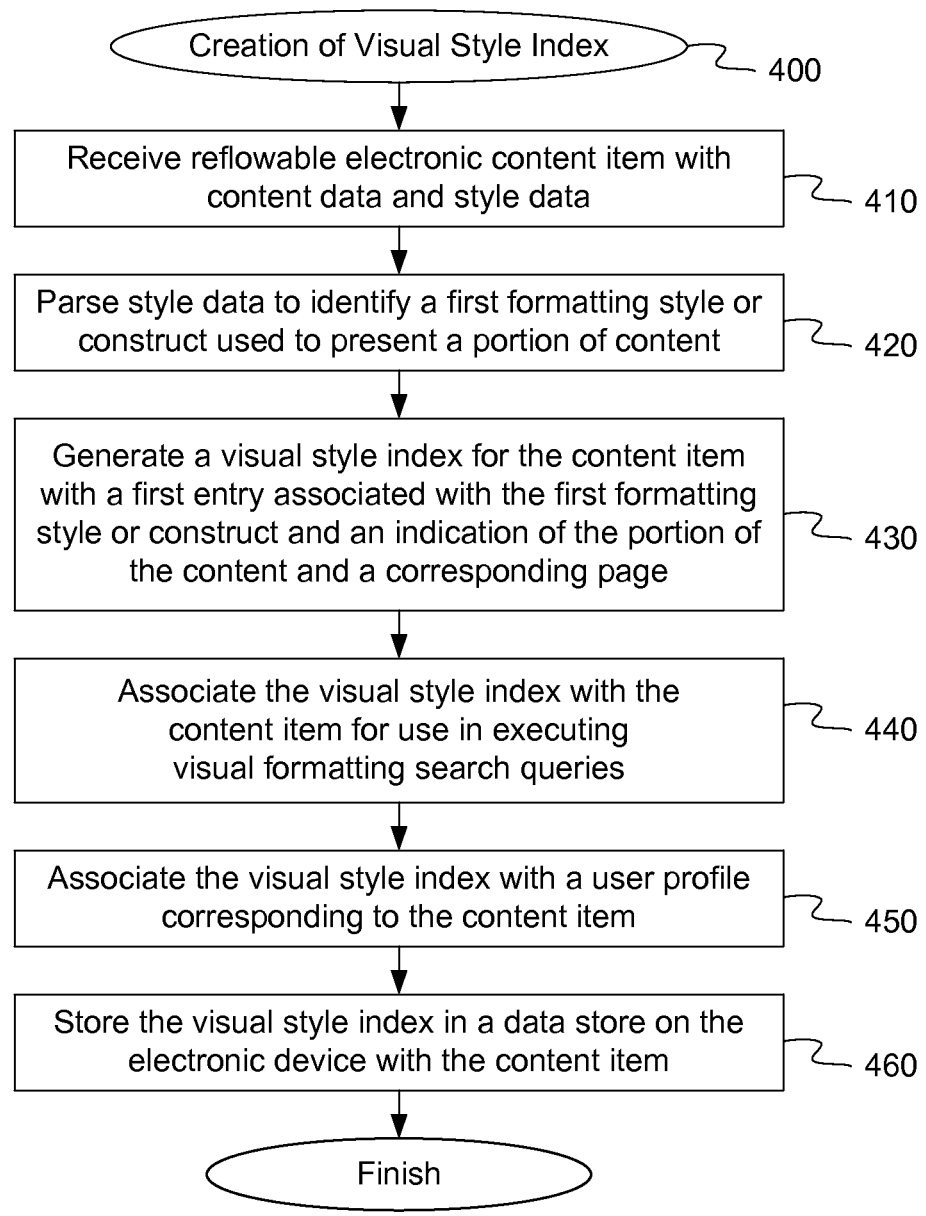
FIG. 4 is a flow diagram illustrating a method for creation of a visual style index, according to an embodiment.

FIG. 4 is a flow diagram illustrating a method for creation of a visual style index, according to an embodiment. The method 400 may be performed by processing logic that comprises hardware (e.g., circuitry, dedicated logic, programmable logic, microcode, etc.), software (e.g., instructions run on a processing device to perform hardware simulation), firmware, or a combination thereof. The processing logic is configured to generate a visual style index associated with an electronic publication for use in executing visual search queries against the content of the electronic publication. In one embodiment, method 400 may be performed by visual style search engine 220, as shown in FIGS. 2 and 3.

Referring to FIG. 4, at block 410, method 400 receives a reflowable electronic content item 332 comprising content data 333 and style data 334. In one embodiment, content item interface 322 may receive reflowable electronic content item 332, including content data 333 and style data 334, from a digital content providing system and store the reflowable electronic content item 332 on storage device 230.

At block 420, method 400 parses the style data 334 to identify at least one of a first formatting style or a first formatting construct used to present at least a portion of the content data 333. In one embodiment, style indexer 324 parses style data 334 of the reflowable electronic content item 332 to identify the formatting styles and constructs used to present the content. Style indexer 324 may examine formatting styles and constructs used in style data 334 and identifies each unique formatting style and formatting construct. In one embodiment, the parsing refers to a formal analysis by style indexer 324 of a string of words in style data 334 to break the string up into its constituents (i.e., individual formatting styles or constructs).

At block 430, method 400 generates a visual style index 335 for the reflowable electronic content item 332 with a first entry associated with the at least one of the first formatting style or the first formatting construct, and comprising an indication of the portion of the content data and an indication of a first page of the reflowable electronic content item with which the portion of the content data was associated according to previous display configuration settings in effect when the page was previously presented. The generated visual style index 335 may include an entry associated with each of the formatting styles and constructs. Each entry may further include an indication of the portions of the content data 333 for the electronic publication that are to be presented in the corresponding formatting style or construct, as indicated in the style data 334. In another embodiment, each occurrence may be included in a separate entry in visual style index 335.

At block 440, method 400 associates the visual style index 335 with the reflowable electronic content item 332, wherein the visual style index 335 is accessible for executing a visual formatting search query on the reflowable electronic content item 332. In one embodiment, style indexer 324 generates a tag for visual style index 335 to indicate that the visual style index 335 corresponds to a particular reflowable electronic content item 332. The tag may include an identifier of reflowable electronic content item 332. In other embodiments, style indexer 324 may annotate visual style index 335 in some other way to indicate the association with reflowable electronic content item 332.

At block 450, method 400 associates the visual style index 335 with a user profile 336 corresponding to the reflowable electronic content item 332. In one embodiment, statistics/profile manager 330 may associate the visual style index 335 with a user profile data 336 corresponding to reflowable electronic content item 332 by including an identifier of the visual style index 335 and reflowable electronic content item 332 in user profile data 336. In this manner, if reflowable electronic content item 332 is accessed by the user on a different device when logged in under the same user profile, the visual style index 335 may be available to the user on that different device for use in executing visual search queries.

At block 460, method 400 stores the visual style index 335 in a data store 230 on an electronic device 200 where the reflowable electronic content item 332 is to be consumed. In one embodiment, style indexer stores visual style index 335 on storage device 230 along with reflowable electronic content item 332 for future use by visual style search engine 220 in executing visual search queries against reflowable electronic content item 332.

Figure 5:
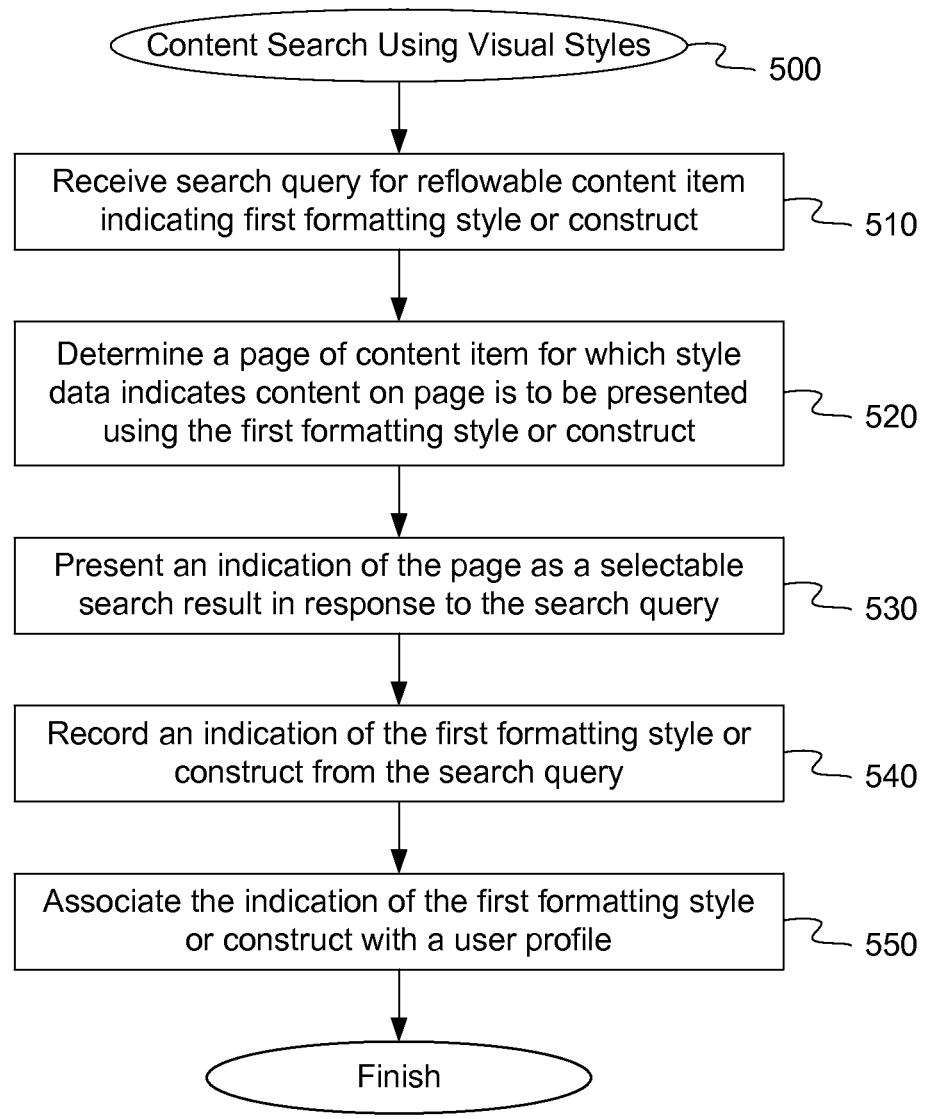
FIG. 5 is a flow diagram illustrating a method for content search using visual styles, according to an embodiment.

FIG. 5 is a flow diagram illustrating a method for content search using visual styles, according to an embodiment. The method 500 may be performed by processing logic that comprises hardware (e.g., circuitry, dedicated logic, programmable logic, microcode, etc.), software (e.g., instructions run on a processing device to perform hardware simulation), firmware, or a combination thereof. The processing logic is configured to search the content of an electronic publication based on the visual styles used to present the text, including particular formatting styles or formatting constructs. In one embodiment, method 500 may be performed by visual style search engine 220, as shown in FIGS. 2 and 3.

Referring to FIG. 5, at block 510, method 500 receives a search query for a reflowable electronic content item, the search query indicating at least one of a first formatting style or a first formatting construct. In one embodiment, user interface 326 receives user input entered through the graphical user interfaces of displays 110 and 120. In one embodiment, the visual search interface may include a visual style search input field 111, a selectable menu 112 with a plurality of formatting style and formatting construct options, and a keyword search input field 113. In one embodiment, visual style search input field 111 may receive a user input search query indicating the at least one of the first formatting style or the first formatting construct. Selectable menu 112 may be, for example, a drop down menu including a list of all available formatting style and construct options. The user may select one or more of the presented options for inclusion in the visual search. Keyword search input field 113 can optionally receive a user input keyword or phrase. If a keyword is provided, the search of the electronic content may be limited to occurrences of the keyword presented according to the visual style or styles indicating using visual style search input field 111, a selectable menu 112, or both.

At block 520, method 500 determines a first page of the reflowable electronic content item for which the style data indicates that at least a portion of the content data associated with the first page was previously presented using the at least one of the first formatting style or the first formatting construct. The content data associated with the first page is defined according to previous display configuration settings in effect when the first page was previously presented. In one embodiment, query manager 328 identifies a first entry corresponding to the at least one of the first formatting style or the first formatting construct in visual style index 335 associated with the reflowable electronic content item 332 and identifies, from the first entry, a location in the content data 333 of the first portion of the content data. Query manager 328 may also recreate the page on which the portion of the content data appeared, as previously rendered. For example, query manager 328 may determine a first location in the content data 333 marking the beginning of the page based on the previous display configuration settings and a second location marking the end of the page. Query manager 328 can request that the content data between the first and second locations be rendered and presented as part of the results to the search query.

At block 530, method 500 causes presentation of an indication of the first page as a selectable search result in response to the search query. In one embodiment, user interface 326 may present output information in the graphical user interfaces of displays 120 and 130 indicating the results of the visual search query executed by visual style search engine 220. In one embodiment, presentation of the search result may include an audio response to the search query. For example, speakers on the device may emit an audio description of various portions of the context that match the formatting style or construct, along with the other search parameters, indicated in the search query.

At block 540, method 500 records an indication of the at least one of the first formatting style or the first formatting construct and at block 550, method 500 associates the indication of the at least one of the first formatting style or the first formatting construct with a user profile corresponding to the search query. In one embodiment, statistics/profile manager 330 records an indication of the formatting styles and constructs used in visual style search queries and associates the indication with a user profile 336 corresponding to the search queries. In this manner, statistics/profile manager 330 can track what formatting styles and constructs the user or a group of users searches for repeatedly or most often. If a particular formatting style or construct is searched for repeatedly, it may be an indication that the visual style is memorable to the user and could be used in the future by publishers to highlight important information.

Figure 6:
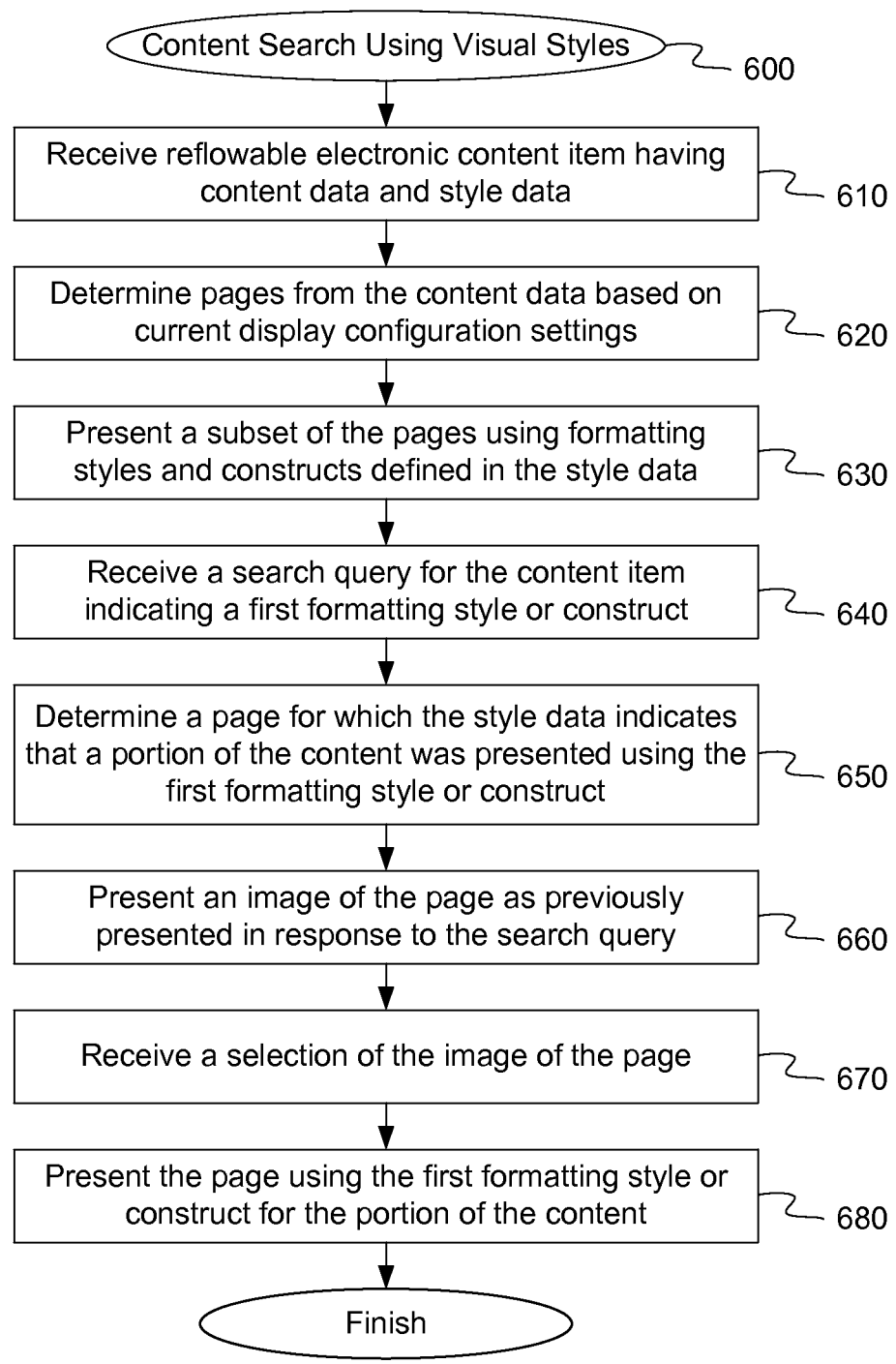
FIG. 6 is a flow diagram illustrating a method for content search using visual styles, according to an embodiment.

FIG. 6 is a flow diagram illustrating a method for content search using visual styles, according to an embodiment. The method 600 may be performed by processing logic that comprises hardware (e.g., circuitry, dedicated logic, programmable logic, microcode, etc.), software (e.g., instructions run on a processing device to perform hardware simulation), firmware, or a combination thereof. The processing logic is configured to search the content of an electronic publication based on the visual styles used to present the text, including particular formatting styles or formatting constructs. In one embodiment, method 600 may be performed by visual style search engine 220, as shown in FIGS. 2 and 3.

Referring to FIG. 6, at block 610, method 600 receives a reflowable electronic content item comprising content data and style data. In one embodiment, content item interface 322 may receive reflowable electronic content item 332, including content data 333 and style data 334, from a digital content providing system and store the reflowable electronic content item 332 on storage device 230.

At block 620, method 600 determines a plurality of pages from the content data, wherein at least a portion of the content data appearing on a first page of the plurality of pages is defined by current display configuration settings for the electronic device. The current display configuration settings may account for display size, display orientation, font size, font type, margin size, character spacing, etc.; each of which can potentially impact the pagination of a reflowable content item. Based on the current display settings, visual style search engine 220 may divide the reflowable content into the plurality of pages, with page breaks delineating the end of one page and the start of the next page.

At block 630, method 600 causes presentation of at least a subset of the plurality of pages on the electronic device using formatting styles and formatting constructs defined in the style data. User interface 326 may cause display of the pages of the reflowable content item on a display of the electronic device 200. The pages may be presented in response to a request from the user (e.g., when the user is reading an e-book). In one embodiment, when the pages are presented, visual style search engine 220 records which pixels of a display screen on the electronic device are used to present certain portions of the content during a reading session. Depending on the pagination determined at block 620, and the orientation of the device relative to gravity, different pixels may be used to display different portions. In one embodiment each pixel, or group of pixels, has a known position on the display screen and is categorized according to relative terms likely to be input or spoken by user (e.g., "top", "bottom", "right", "left", "middle", "center"). Thus, to help satisfy visual search queries, the position of each portion of the text when presented to the user can be recorded for use in identifying certain visual styles or visual constructs at a corresponding position.

At block 640, method 600 receives a search query for the reflowable electronic content item, the search query indicating at least one of a first formatting style or a first formatting construct appearing on one of the subset of the plurality of pages. In one embodiment, user interface 326 receives user input entered through the graphical user interfaces of displays 110 and 120.

At block 650, method 600 determines a second page of the subset of the plurality of pages for which the style data indicates that at least a portion of the content data associated with the second page was presented using the at least one of the first formatting style or the first formatting construct. In one embodiment, query manager 328 identifies a first entry corresponding to the at least one of the first formatting style or the first formatting construct in visual style index 335 associated with the reflowable electronic content item 332 and identifies, from the first entry, a location in the content data 333 of the portion of the content data. Query manager 328 may also recreate the page on which the portion of the content data appeared, as previously rendered.

At block 660, method 600 causes presentation of an indication of the second page in response to the search query, the indication of the second page comprising an image of the second page as previously presented according to the current display configuration settings in effect when the second page was previously presented. In one embodiment, user interface 326 may present output information in the graphical user interfaces of displays 120 and 130 indicating the results of the visual search query executed by visual style search engine 220.

At block 670, method 600 receives a selection the indication of a page from the search results and at block 680, method 600 causes presentation of the page of the reflowable electronic content item 332 at the first location, the first portion comprising the content presented using the first formatting style. In response to the selection of one of the search results from display 120, display 130 presents a page 131 of the electronic content corresponding to the selected search result. For example, if the electronic content is a digital publication, the visual style search engine may navigate to the page of the digital publication where the selected search result is presented and display all or a portion of that page. The portion of the electronic content may include the selected keyword and may be presented using the selected visual style, as indicated in the performed visual search.

The visual style search techniques have been described herein with respect to textual content from an electronic publication. It should be understood, however, that visual search may be applicable to other media types as well, such as images, video, audio, graphic novels, comic books, etc. Depending on the type of media, the formatting styles used to identify certain portions of content may vary. For example, when searching audio content, the formatting of a font would not be applicable. Certain styles that may be searchable in audio content can include, for example, volume, frequency, identify of the speaker, etc. These styles may be searchable as long as there is some indication of their occurrence in metadata associated with the content that can be correlated with a location in the content itself.

In one embodiment, other factors may be used in combination with the visual styles in order to perform a content search. For example, visual style search engine 220 may track when and where certain portions of reflowable electronic content item 332 were presented to the user (i.e., when and where they were read by the user). Visual style search engine 220 can use this information to further filter content searches. For example, a search query could include all content that is presented in table form but that was read within the last month while at a specific geographic location (i.e., "home"). In another embodiment, this time or location information may be used to weight the search results presented to the user in response to a visual search query. For example, the search results could be ordered based on when the corresponding content was previously read by the user, with the most recently read content appearing higher in the search result list.

Figure 7:
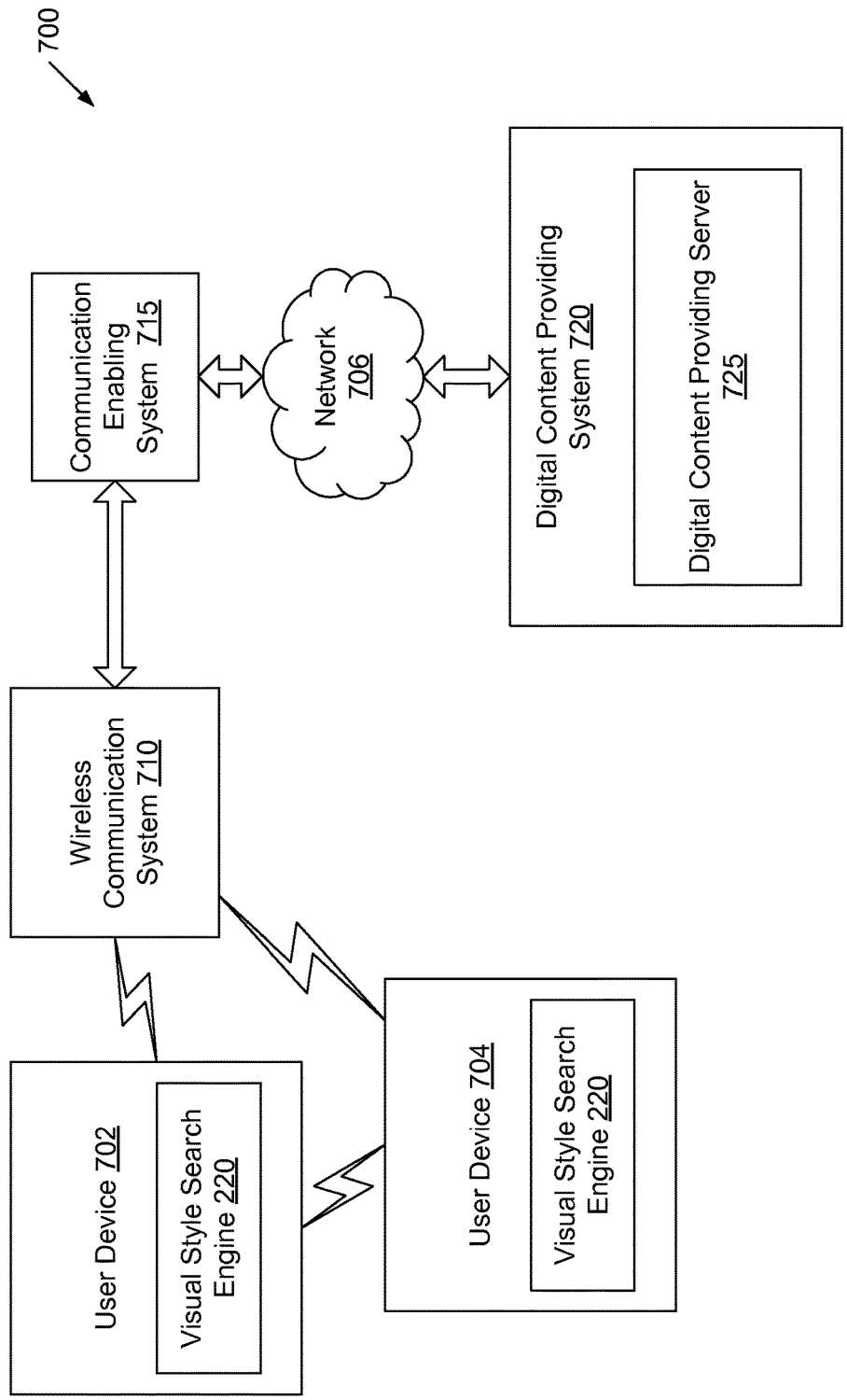
FIG. 7 is a block diagram of a network architecture, in which embodiments of the present invention may operate.

FIG. 7 is a block diagram of a network architecture 700, in which embodiments of the present invention described herein may operate. The network architecture 700 may include a digital content providing system 720 and one or more user devices 702, 704 capable of communicating with the digital content providing system 720 via a network 706. Network 706 may include, for example, a public network such as the Internet or a private network such as a local area network (LAN).

The user devices 702, 704 may be portable computing devices such as electronic book readers or tablet computers (e.g., that include a book reader application). Other examples of portable computing devices include cellular telephones, personal digital assistants (PDAs), portable media players, netbooks, and the like. The user devices 702, 704 may also be non-portable computing devices such as a desktop computer, a set-top box associated with a television, a gaming console, and so on. The user devices 702, 704 are variously configured with different features to enable consumption of one or more types of digital content and electronic publications. The digital content and electronic publications may include electronic books (ebooks) such as electronic textbooks and/or other electronic publications (electronic versions of publications) such as electronic magazines, digital newspapers, digital audio books, electronic journals, real simple syndication (RSS) feeds, etc. The publications may also include digital video (e.g., movies, television, short clips, etc.), images (e.g., art, photographs, etc.), and multi-media content.

The digital content providing system 720 may correspond to any feature or combination of features for providing electronic publications or other digital content to the user devices 702, 704. The digital content providing system 720 may include a network-accessible server-based functionality (digital content providing server 725), various data stores (not shown), and/or other data processing equipment. The digital content providing system 720 may be implemented by a single machine or a cluster of machines. The digital content providing system 720 may include one or more machines (e.g., one or more server computer systems, routers, gateways, etc.) that have processing and storage capabilities to provide the server-based functionality.

In one embodiment, the digital content providing server 725 corresponds to an entity which provides electronic publications (e.g., electronic books) to users upon the users' purchase or download of the items. In this role, the digital content providing server 725 may essentially act as a bookseller or the like. In other cases, the digital content providing server 725 corresponds to an entity which provides electronic publications to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

The digital content providing server 725 may deliver, and the user devices 702, 704 receive, electronic publications (or other media items), search results, upgrades, and/or other information via the network 706. For example, the user devices 702, 704 may download or receive ebooks from the digital content providing server 725. The digital content providing server 725 may also receive various requests (e.g., search queries), instructions and other data from the user devices 702, 704 via the network 706.

Communication between the user devices 702, 704 and the item providing system 720 may be enabled via any communication infrastructure. One example of such an infrastructure includes a combination of a wide area network (WAN) and wireless infrastructure, which allows a user to use the user devices 702, 704 to purchase digital content (e.g., electronic publications) and consume the digital content without being tethered to the digital content providing system 720 via hardwired links. The wireless infrastructure may be provided by one or multiple wireless communications systems, such as wireless communication system 710. In one embodiment, wireless communication system 710 may be a wireless fidelity (WLAN) hotspot connected with the network 706. Wireless communication system 710 may also be a wireless carrier system that can be implemented using various data processing equipment, communication towers, etc. Alternatively, or in addition, the wireless carrier system may rely on satellite technology to exchange information with the user devices 702, 704.

The communication infrastructure may also include a communication-enabling system 715 that serves as an intermediary in passing information between the digital content providing system 720 and the wireless communication system 710. The communication-enabling system 715 may communicate with the wireless communication system 710 (e.g., a wireless carrier) via a dedicated channel, and may communicate with the digital content providing system 720 via a non-dedicated communication mechanism, (e.g., a public Wide Area Network (WAN) such as the Internet).

In addition to wirelessly connecting to wireless communication system 710, user devices 702, 704 may also wirelessly connect to other user devices 702, 704. For example, user device 702 may form a wireless ad hoc (peer-to-peer) network with user device 704 using WiFi™, Bluetooth, or other wireless communication protocols.

In one embodiment, each of user devices 702, 704 include visual style search engine 220. As described above, visual style search engine 220 may be configured to perform a content search based on visual styles used to present the content. Additional details of visual style search engine 220 are provided above.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device in an electronic device, a reflowable electronic content item comprising content data and style data;
   determining, by the processing device, a plurality of pages from the content data, wherein at least a portion of the content data appearing on a first page of the plurality of pages is defined by current display configuration settings for the electronic device;

causing, by the processing device, presentation of at least a subset of the plurality of pages on the electronic device using formatting styles and formatting constructs defined in the style data;

receiving, by the processing device, a search query for the reflowable electronic content item, the search query indicating at least one of a first formatting style or a first formatting construct appearing on one of the subset of the plurality of pages;

determining, by the processing device, a second page of the subset of the plurality of pages for which the style data indicates that at least a portion of the content data associated with the second page was presented using the at least one of the first formatting style or the first formatting construct, wherein the second page comprises a defined segment of the content data of the reflowable electronic content item that was previously presented according to previous display configuration settings in effect on the electronic device when the second page was previously presented;

generating an indication of the second page using the at least one of the first formatting style or the first formatting construct for the at least the portion of the content data associated with the second page as indicated in the style data to recreate a visual presentation of the second page as previously presented; and causing, by the processing device, presentation of the indication of the second page in response to the search query, the indication of the second page comprising an image of the second page as previously presented according to the current display configuration settings in effect when the second page was previously presented.

2. The method of claim 1, wherein determining the second page comprises:
identifying, by the processing device, an entry corresponding to the at least one of the first formatting style or the first formatting construct in a visual style index associated with the reflowable electronic content item; and
determining, by the processing device from the entry, a plurality of locations in the content data where the at least one of the first formatting style or the first formatting construct is used to present at least a portion of the content data.

3. The method of claim 1, further comprising receiving, by the processing device, a selection of the indication of the second page.

4. The method of claim 1, wherein at least one of the current display configuration settings for the electronic device are different than the current display configuration settings in effect when the second page was previously presented or the second page was previously presented on a different electronic device.

5. An electronic device comprising:
a memory to store a reflowable electronic content item comprising content data and style data; and
a processing device, operatively coupled to the memory, the processing device to:
receive a search query for the reflowable electronic content item, the search query indicating at least one of a first formatting style or a first formatting construct;
determine a first page of the reflowable electronic content item for which the style data indicates that at least a portion of the content data associated with the first page was previously presented using the at least one of the first formatting style or the first formatting construct, wherein the first page comprises a defined segment of the content data of the reflowable electronic content item that was previously presented according to previous display configuration settings in effect on the electronic device when the first page was previously presented, and wherein the content data associated with the first page is defined according to the previous display configuration settings;
generate an indication of the first page of the reflowable electronic content item using the at least one of the first formatting style or the first formatting construct for the at least the portion of the content data associated with the first page as indicated in the style data to recreate a visual presentation of the first page as previously presented; and
cause presentation of the indication of the first page as a search result.

6. The electronic device of claim 5, wherein the processing device is further to:
determine a first entry corresponding to the at least one of the first formatting style or the first formatting construct in a visual style index associated with the reflowable electronic content item; and
determine, from the first entry, a location in the content data of the first page of the reflowable electronic content item.

7. The electronic device of claim 6, wherein the visual style index comprises a plurality of entries corresponding to a plurality of formatting styles and formatting constructs represented in the style data of the reflowable electronic content item.

8. The electronic device of claim 5, wherein current display configuration settings for the electronic device are different than the previous display configuration settings causing the at least the portion of the content data to be associated with a second page of the reflowable electronic content item.

9. The electronic device of claim 8, wherein the first page of the reflowable electronic content item comprises a first subset of the content data between a first location and a second location defined according to the previous display configuration settings and wherein the second page of the reflowable electronic content item comprises a second subset of the content data between a third location and a fourth location defined according to the current display configuration settings.

10. The electronic device of claim 5, wherein the processing device is further to receive a selection of the indication of the first page of the reflowable electronic content item.

11. The electronic device of claim 10, wherein the processing device is further to:
record an indication of the at least one of the first formatting style or the first formatting construct; and
associate the indication of the at least one of the first formatting style or the first formatting construct with a user profile corresponding to the search query.

12. The electronic device of claim 10, wherein the search query further comprises a keyword from the reflowable electronic content item, and wherein the processing device is further to:
determine a third page of reflowable electronic content item for which the style data indicates that the keyword is to be presented using the at least one of the first formatting style or the first formatting construct on the third page; and cause presentation of an indication of the third page as a search result.

13. The electronic device of claim 10, wherein to receive the search query for the reflowable electronic content item, the processing device to receive audio data representing user speech captured by a microphone in the electronic device.

14. A method comprising:
receiving, by a processing device, a reflowable electronic content item comprising content data and style data;
parsing the style data;
identifying at least one of a first formatting style or a first formatting construct used to present at least a portion of the content data;
generating, by the processing device, a visual style index for the reflowable electronic content item, wherein generating the visual style index comprises generating a first entry associated with the at least one of the first formatting style or the first formatting construct, wherein generating the first entry comprises generating an indication of the at least the portion of the content data and generating an indication of a first page of the reflowable electronic content item with which the portion of the content data was associated, wherein the first page comprises a defined segment of the content data of the reflowable electronic content item that was previously presented according to previous display configuration settings in effect when the first page was previously presented; and
associating, by the processing device, the visual style index with the reflowable electronic content item.

15. The method of claim 14, wherein receiving the reflowable electronic content item comprising the content data comprises receiving a textual content of the reflowable electronic content item and wherein receiving the reflowable electronic content item comprising the style data comprises receiving formatting styles and formatting constructs associated with different portions of the textual content.

16. The method of claim 14, further comprising:
identifying current display configuration settings that are different than the previous display configuration settings, the current display configuration settings to cause the at least the portion of the content data to be associated with a second page of the reflowable electronic content item.

17. The method of claim 16, wherein generating the indication of the first page of the reflowable electronic content item comprises generating an indication of a first subset of the content data between a first location and a second location defined according to the previous display configuration settings and wherein the second page of the reflowable electronic content item comprises a second subset of the content data between a third location and a fourth location defined according to the current display configuration settings.

18. The method of claim 14, wherein parsing the style data comprises identifying a plurality of unique formatting styles or formatting constructs in the style data associated with presentation of at least a portion of the content data.

19. The method of claim 14, wherein generating the first entry in the visual style index comprises generating an indication of a different portion of the content data for which the style data indicates that the different portion is to be presented using the at least one of the first formatting style or the first formatting construct and an indication of a third page of the reflowable electronic content item with which the different portion of the content data was associated according to the previous display configuration settings used to previously present the third page.

20. The method of claim 14, further comprising:
associating the visual style index with a user profile corresponding to the reflowable electronic content item; and
storing the visual style index in a data store on an electronic device where the reflowable electronic content item is to be consumed.

* * * * *